(12) United States Patent
Byard et al.

(10) Patent No.: US 10,310,881 B2
(45) Date of Patent: Jun. 4, 2019

(54) COMPOSITING DATA MODEL INFORMATION ACROSS A NETWORK

(71) Applicant: VMware, Inc., Palo Alto, CA (US)

(72) Inventors: David Byard, San Jose, CA (US); Wit Riewrangboonya, Mountain View, CA (US); Nick Tenczar, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 750 days.

(21) Appl. No.: 14/927,097

(22) Filed: Oct. 29, 2015

(65) Prior Publication Data

US 2017/0123831 A1    May 4, 2017

(51) Int. Cl.
*G06F 9/455*    (2018.01)

(52) U.S. Cl.
CPC .......... *G06F 9/45558* (2013.01); *G06F 2009/45591* (2013.01); *G06F 2009/45595* (2013.01)

(58) Field of Classification Search
USPC ................................................ 709/224–226
See application file for complete search history.

(56) References Cited

U.S. PATENT DOCUMENTS

| 8,175,863 B1* | 5/2012 | Ostermeyer | G06F 17/5009 703/13 |
| 2002/0178246 A1* | 11/2002 | Mayer | H04L 41/0893 709/223 |
| 2003/0189919 A1* | 10/2003 | Gupta | H04L 41/044 370/351 |
| 2012/0151198 A1* | 6/2012 | Gupta | G06F 9/45558 713/2 |
| 2012/0265324 A1* | 10/2012 | Colombo | G05B 19/4188 700/29 |
| 2013/0028152 A1* | 1/2013 | Kim | H04W 88/08 370/310 |
| 2016/0197803 A1* | 7/2016 | Talbot | G06F 16/188 709/224 |
| 2016/0254964 A1* | 9/2016 | Benc | H04L 41/0853 709/223 |

* cited by examiner

*Primary Examiner* — Duyen M Doan
(74) *Attorney, Agent, or Firm* — Clayton, McKay & Bailey, PC

(57) ABSTRACT

A method for managing a virtual infrastructure is described. The method includes: generating a configuration information model representing a virtual infrastructure based on known virtual machines and network settings thereon; querying one or more sources of truth other than the known virtual machines, wherein the one or more sources of truth includes a data storage that stores at least one data object that answers a particular question; and comparing the data from the one or more sources of truth with a store of configuration model information, wherein the configuration model information comprises a time stamp and a source identifier; based on the comparing, generates a set of rules; and based on the set of rules, updates the configuration information model.

18 Claims, 14 Drawing Sheets

1200

SENDING CONFIGURATION MODEL INFORMATION UPDATES TO NODES
1250

MAINTAINING A LIST OF NODES AND SELECTING AT LEAST ONE NODE FROM THE LIST OF NODES TO WHICH TO SEND THE CONFIGURATION MODEL INFORMATION UPDATES
1255

RECEIVING A REQUEST OT UPDATE A PORTION OF THE CONFIGURATION MODEL INFORMATION AND UPDATING THE PORTION OF THE CONFIGURATION MODEL INFORMATION
1260

FIG. 12B

COMPOSITING DATA MODEL INFORMATION ACROSS A NETWORK

FIELD OF THE INVENTION

This invention generally relates to the sourcing and compositing of information across a group of systems that can be described using a common model.

BACKGROUND

In a network environment, allowing a user to have a consistent view of the operating environment requires information from a variety of sources. Sometimes these sources overlap in terms of the information available, and arbitrary decisions may need to be made about where the information to present to the user comes from.

When a user logs in to a system, the user is able to manage objects associated with that system. The user may be granted different sets of privileges on those objects having to do with the ability to view, update, remove, or operate on those objects.

For instance, a user may have a view of a virtual environment on the network. You can either query each host, each VM or query server that manages all of the hosts and virtual machines. You are liable to get some duplicate and some different information from each source.

What is needed is a process for sourcing and compositing information for a user so that the user has a consistent view of his environment.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIGS. 12A and 12B are a flow diagram for a method for managing a virtual infrastructure, in accordance with an embodiment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms and variation of such terms such as "generates", "queries", "compares", "updates", "receives", "initiates", "monitoring", "updating", "sends", "maintains", "selects", or the like, often refer to the actions and processes of an electronic computing device (or portion thereof), module or system, such as, but not limited to, a virtual infrastructure manager 1000 (See FIGS. 10 and 11), unless noted otherwise. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Conventional virtual infrastructure management technologies pull information from known configured services and virtual machines running thereon, as well as the network settings on the virtual machines. However, frequently, the virtual environment also includes unconfigured computer services (such as services being setup) and out of network services, the configuration information for which conflicts with that information from known and configured services.

Embodiments of the present technology provide a solution, via a virtual infrastructure manager, and methods described herein, for managing a virtual infrastructure by collecting information from various sources of truth and creating a coherent virtual infrastructure model.

Figure 4:
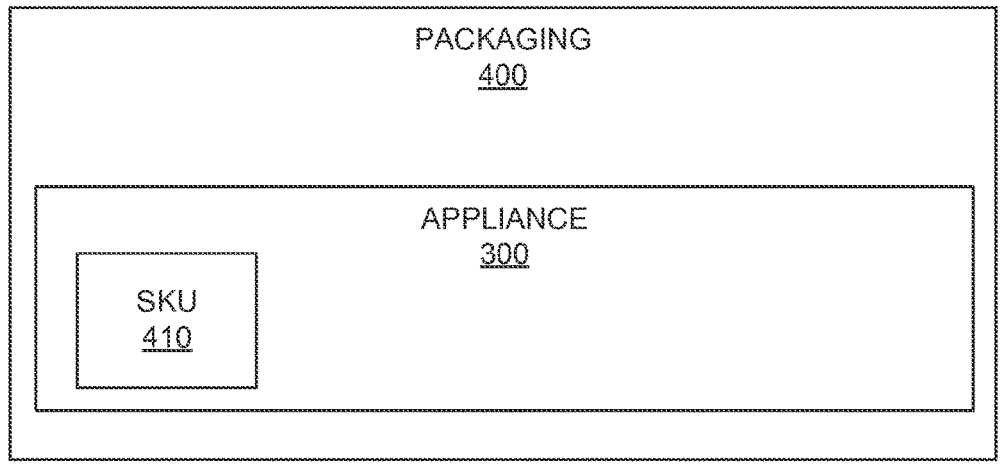
FIG. 4 is a block diagram of a side-view of an appliance offered for sale, in accordance with an embodiment.
Figure 5:
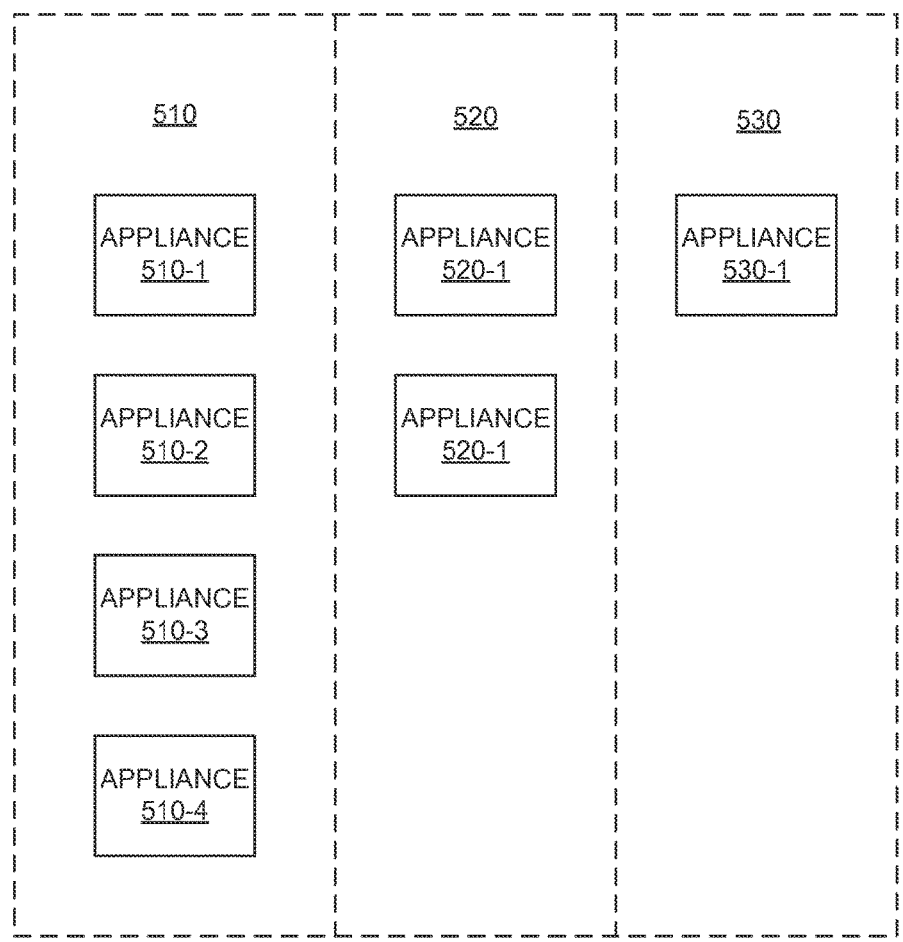
FIG. 5 is a block diagram of a virtualization infrastructure, in accordance with an embodiment.
Figure 12A:
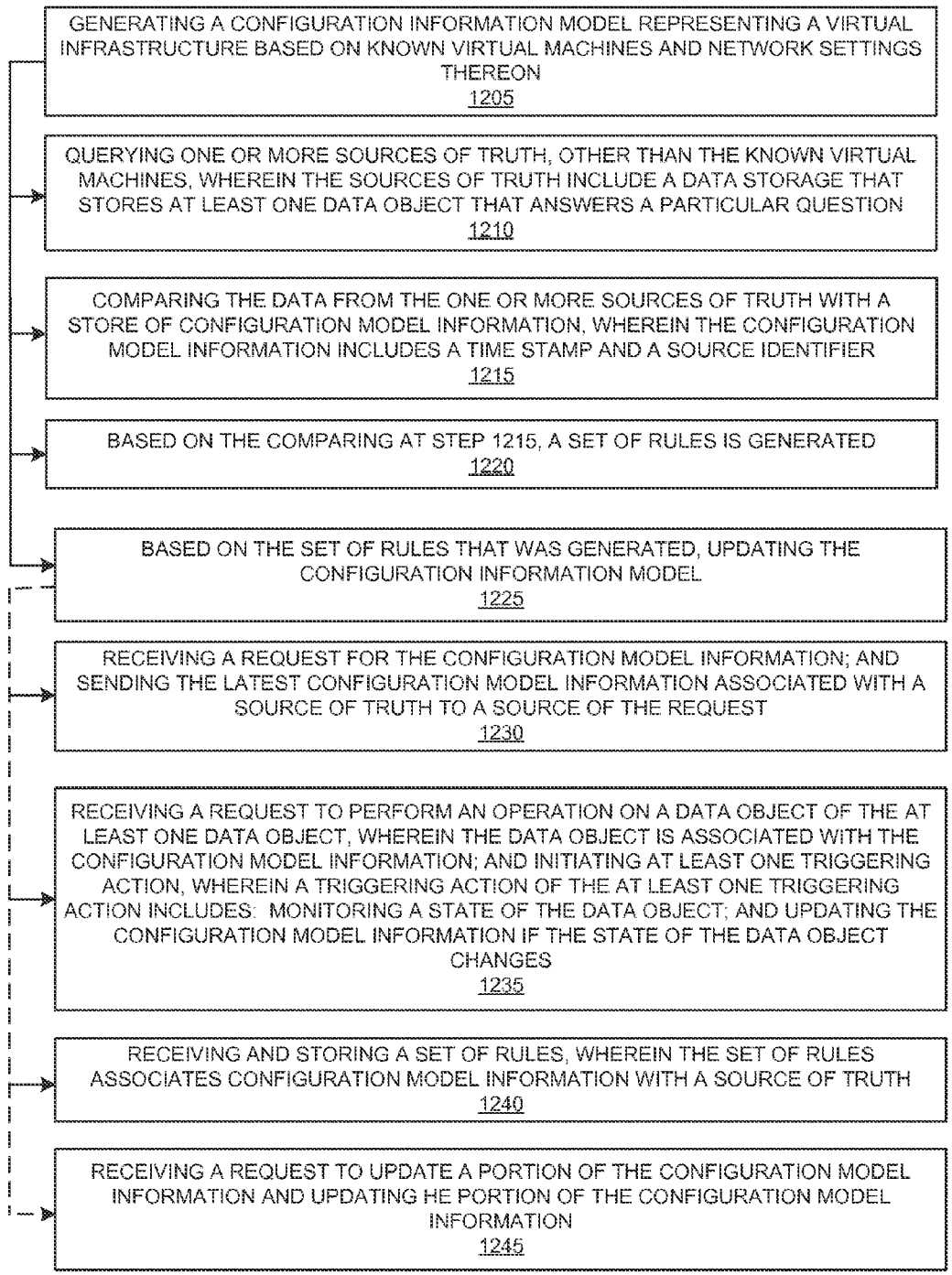
Figure 13:
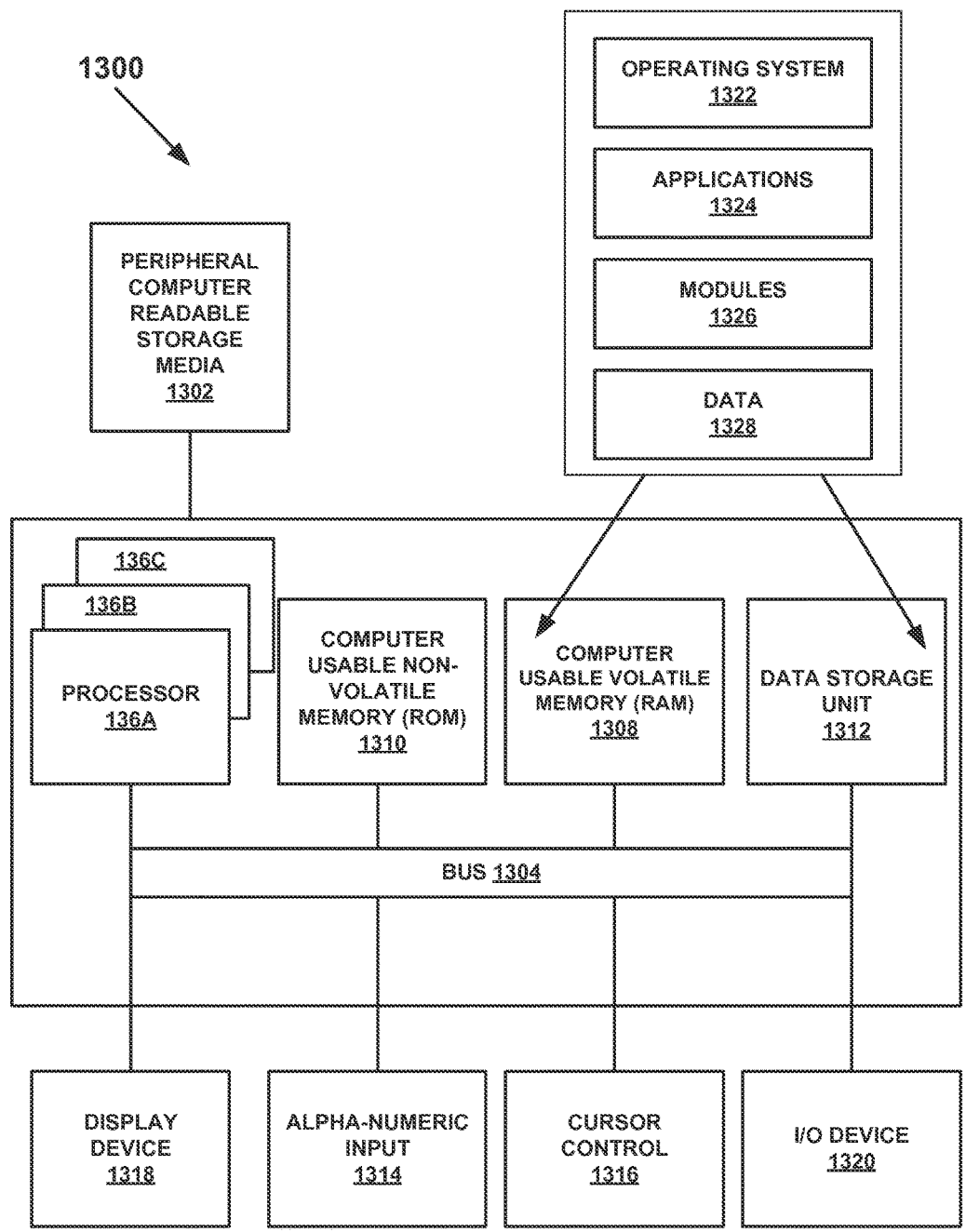
FIG. 13 is a block diagram of an example computer system with which or upon which various embodiments of the present invention may be implemented.

The following discussion will begin with a description of virtual computing environment (FIG. 1), a host computing system (FIG. 2), an appliance (FIGS. 3 and 4), and a virtualization infrastructure (FIG. 5). The discussion continues with a general description of embodiments, with reference to FIGS. 6-9. Then, a more detailed description of a virtual infrastructure manager is described (FIG. 10), as well as a method (FIG. 11), and a system (FIG. 12) for managing a virtual infrastructure, in accordance with an embodiment. With reference to FIG. 13, the discussion concludes with a description of an example computer system with which or upon which various embodiments of the present technology may be implemented.

Virtual Computing Environment

Figure 1:
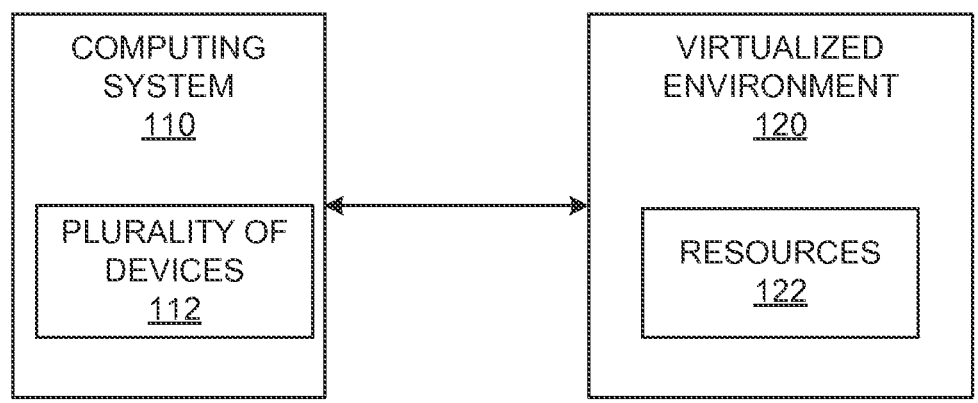
FIG. 1 is a block diagram of a virtual computing environment, in accordance with an embodiment.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, computing system 110 uses resources 122 because computing system 110 typically does not have dedicated resources that can be given to the virtualized environment 120. For example, an enterprise system (of the computing system 110) may provide various computing resources for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines of the computing system 110 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure 100 may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may connect, via an Internet connection, with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware Exit hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computing System

Figure 2:
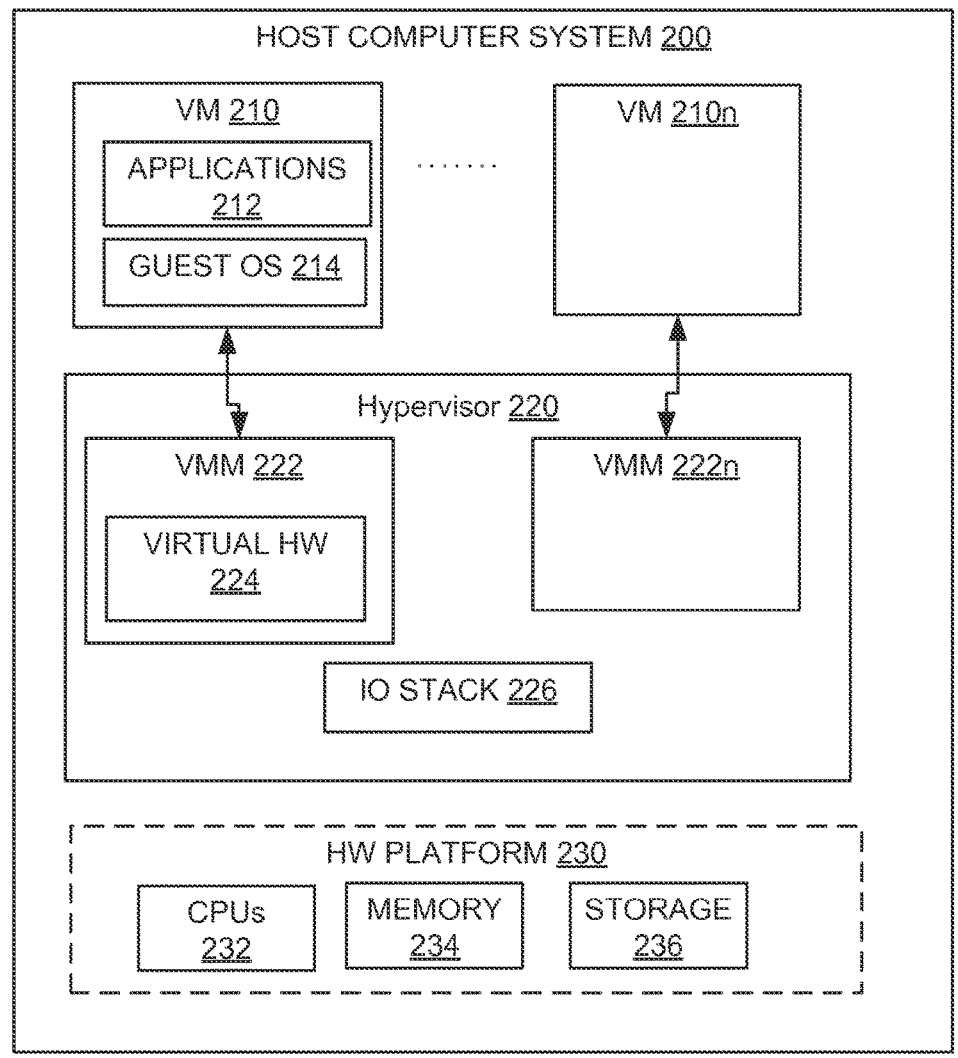
FIG. 2 is a block diagram of a host computing system, in accordance with an embodiment.

FIG. 2 is a schematic diagram that illustrates a virtualized computer system that is configured to carry out one or more embodiments of the present invention. The virtualized computer system is implemented in a host computer system 200, which includes hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3 FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
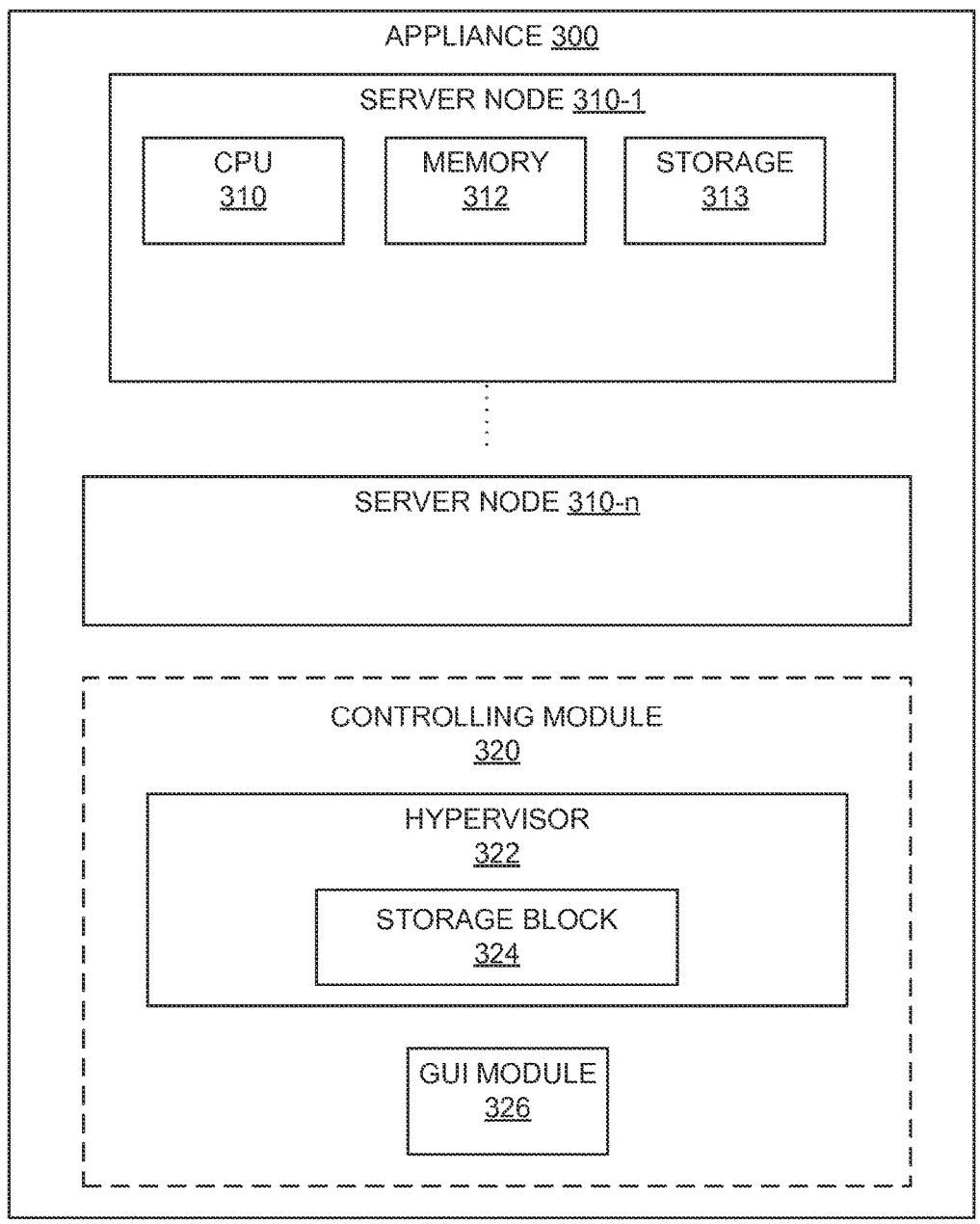
FIG. 3 is a block diagram of an appliance, in accordance with an embodiment.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines, while other server nodes are each able to independently host other sets of virtual machines, respectively.

The server nodes are independent of one another, and are not required to share any functionality with one another.

Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2 U/4 Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4 Node appliance. That is, appliance 300 is four rack units in height and includes 4 server nodes (e.g., server nodes 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Controlling module 320 runs on one or the nodes inside of a hypervisor hypervisor 322 (but does not contain a hypervisor). As described above, a hypervisor is installed on top of hardware platform (e.g., CPU, memory and storage) and supports a virtual machine execution space within which one or more virtual machines (VMs) may be concurrently instantiated and executed.

Each of the nodes is a hypervisor, controlling module 320 is vCenter/EVO RAIL.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that controlling module 320, in one embodiment, includes a suite of software tools for cloud computing (e.g., VMware vSphere™, VCenter™) that utilizes various components such as a VMware ESX/ESXi hypervisor. The controlling module 320 contains among other things, a federated SSO module and an autodiscovery module. The controlling module 320 is running on one of the four nodes, inside a hypervisor. It actually controls the hypervisor, as it runs in all of the other hypervisors in the other nodes of the box.

Controlling module 320, in one embodiment, includes a centralized management tool for an appliance or a cluster of appliances, which will be described in further detail below. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface.

Controlling module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer. However, of note, the controlling module 320 does not contain a hypervisor, but controls the hypervisors that it manages.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

General Description of Embodiments

With reference now to FIGS. 6-9, a general description of various embodiments is described. This general description is followed by a more detailed description, with reference to FIGS. 10-12.

Various embodiments provide a method and system for managing a virtual infrastructure through the creation of a coherent virtual infrastructure model. Firstly, using virtual machines and the network settings thereon that are known to a computing system, an embodiment that is coupled with or residing on the computing system, generates a configuration information model that represents the current virtual infrastructure (as known to the computing system). An embodiment then queries sources of truth, other than the known virtual machines. A source of truth is a data source that stores at least one data object that answers a particular question and/or fulfills a particular request for information.

Next, the data received from the sources of truth is compared with the configuration model information stored at the computing system. Based on this comparison, an embodiment generates a set of rules. The set of rules outlines a defined relational model. A defined relational model defines how users interact with their environment based on user permissions. Sources of truth contribute to the defined relational model. Sources of truth update the model for each login user. In one or more embodiments, the defined relational model consists of tables in memory containing lists of objects. Changes are triggered by various processes such as property collectors, database changes, or messages received from other nodes on the network. The changes could be consumed by a rules engine or saved into a database directly. Each user that accesses a virtual infrastructure will have a different perspective of what the virtual infrastructure includes, because every user may have different privileges, which means each user will see a different amalgamation of the different sources. An embodiment combines all of the external systems into one infrastructure.

When an object is received, based on the set of rules, a change is triggered and the configuration information model is updated.

In one or more embodiments, data objects are received from disparate sources, and depending on user permissions, these data objects may or may not be added to the defined relational model. For instance, a user can see just his username, or one appliance, all appliances in a LAN, all appliances across the WAN associated with some key value/function, etc. (e.g., services, specific VMs, etc.)

In one or more embodiments, the same or similar data can be provided by several providers. Some data is duplicated, while other data is overlapped. For instance, a network broadcast protocol could give you a list of active VMs, while a virtual system manager like vCenter would give you all VMs and nodes, whether active or not.

In one or more embodiments, a set of rules are defined to de-duplicate the data. For instance, if the same data comes from a vCenter and a broadcast protocol, an embodiment, via the set of rules, instructs the data from the vCenter to be taken, such that the data from both the vCenter and the broadcast protocol are not taken. When there is a conflict, embodiments ensure that these conflicts are resolved based on separate rules relating to business requirements associated with various sources involved.

For example, a node managing other nodes is the source of truth for the DNS addresses of all nodes it is managing. However if a node is not managed by another node, it is its own source of truth for its DNS address.

A cluster is a formal model where a cluster contains one or more nodes. A node is a single or group of computers that share a common model.

In one or more embodiments, getting or setting information in the configuration information model triggers interactions with the one or more sources of truth.

Figure 6:
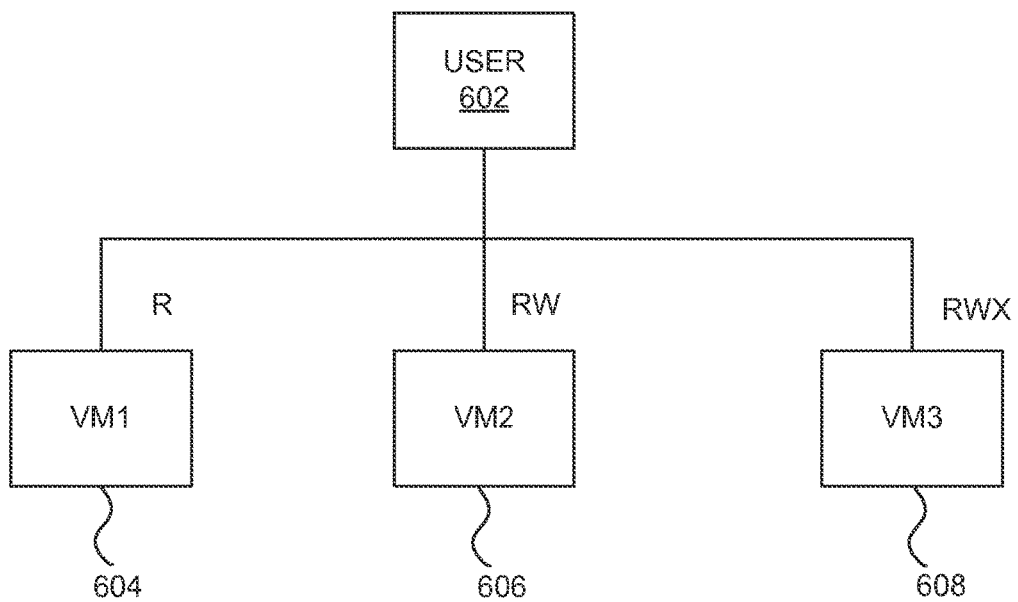
FIG. 6 is an example of a defined relational model, in accordance with an embodiment.

With reference to FIG. 6, an example of a defined relational model and operations thereon is described. The user 602 has access to three virtual machines. For VM1 604, the user 602 can only view the information associated with it. For example, the user 602 may view the memory and disk footprint but not change the memory or disk footprint. For VM2 606, the user 602 can update values on the VM2 606 but cannot perform operations on it. For example, the user 602 may view and alter the memory footprint but not shut down the system. For VM3 608, the user 602 can update values on the VM3 608 and perform operations on the VM3 608. For example, the user 602 may alter the attributes of the VM3 608 and shut it down.

The representation of a user also has a model associated with it. For example, a user has a username, role and set of privileges that are read only. A user may change his or her authentication information.

A source of truth for configuration information about a VM can be any system entity that captures the latest information about the VM, which could be the VM itself, or the host that manages it or the application that manages the host. Each may have access to different sets of data about the VM, so not all of the VM information may come from just one source. For instance, a VM may be aware of how much disk and memory it is using, but only the application managing it may know how much the application has allocated for growth and what the threshold is for triggering growth or shrinking resources.

In order to avoid getting information from multiple sources, rules must be setup to handle conflicts in one or more embodiments. For each data object there will be one primary source of truth. However, if that source of truth is not available, then the rules may enable an alternate source if such alternate source is available, in one or more embodiment.

In one or more embodiments, whenever a change is detected by a source of truth, that information may be sent out on the network. Included in that information will be an identifier associated with the data being updated, an identifier associated with the source of truth, and a timestamp.

Once the change is detected, in one or more embodiments, the change needs to be broadcast to all users who need to know this change.

A change occurs directly if a user or process changes data directly. A change occurs indirectly if an operation is performed that has side effects. When a change occurs directly, then the request for the change can be captured and the source of truth updated in one or more embodiments. When an operation occurs, in one or more embodiments, one or more triggers must be setup to capture changes in the object or objects affected by the operation.

In one or more embodiments, the change is broadcast to all nodes on request. In other embodiments, a gossip protocol is used to communicate the changes. In one or more embodiments, nodes are selected at random to pass on a change received from another node, or a change initiated by a user on a particular node.

In one or more embodiments, each node would have a source of truth process which accepts updated information from each other node and stores the data associated with the latest timestamp of that information. In other embodiments, the source of truth process further filters the information for each user based on the rules setup for that user. Further, the source of truth process may broadcast changes to any data object to the source of truth associated with that data object.

Figure 7:
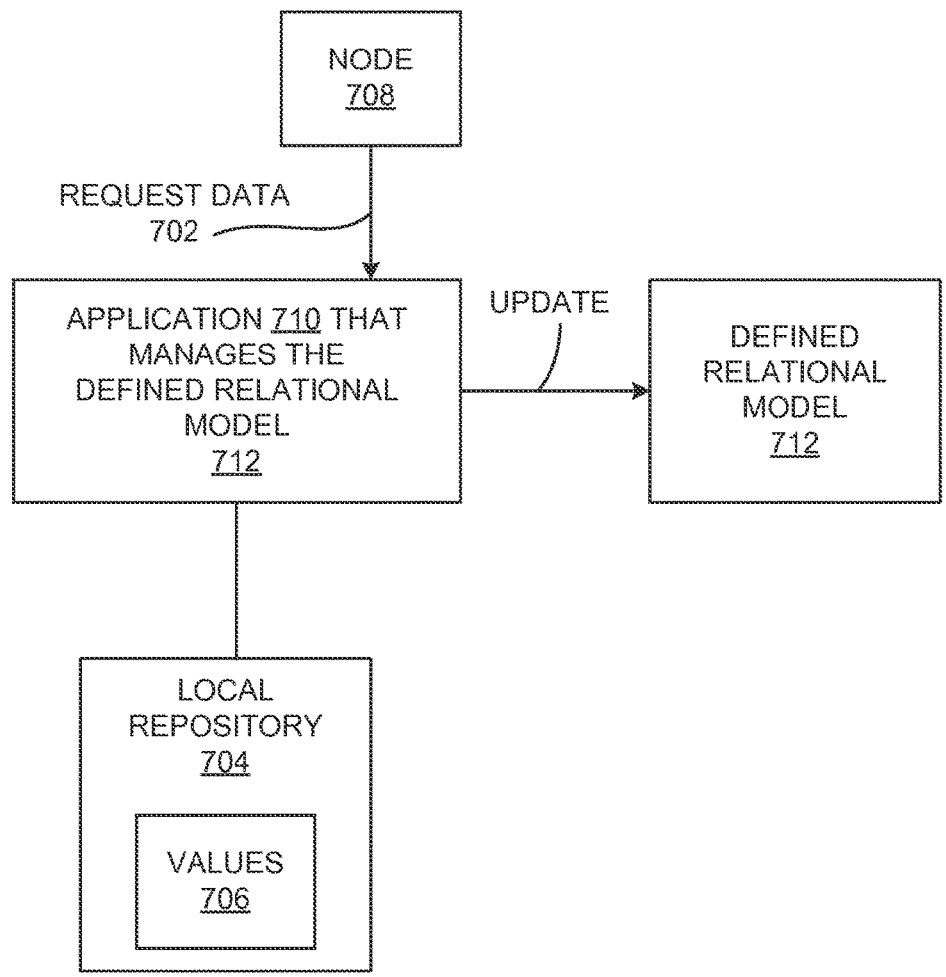
FIG. 7 shows a workflow for one or more embodiments of how an application on a node would request data to update the defined model, in accordance with an embodiment.

FIG. 7 shows a workflow for one or more embodiments of how an application on a node 708 would request data 702 to update the defined relational model 712. In response to this, the application 710 managing the defined relational model 712 checks the local repository 704 to see what value(s) 706 it has associated with the data 702. The value(s) 706 would vary based on the timestamp and the source of truth. Rules would be in place to filter the data to one value or set of values 706 which would then be returned to the requester (node 708) to update the defined relational model 712.

Figure 8:
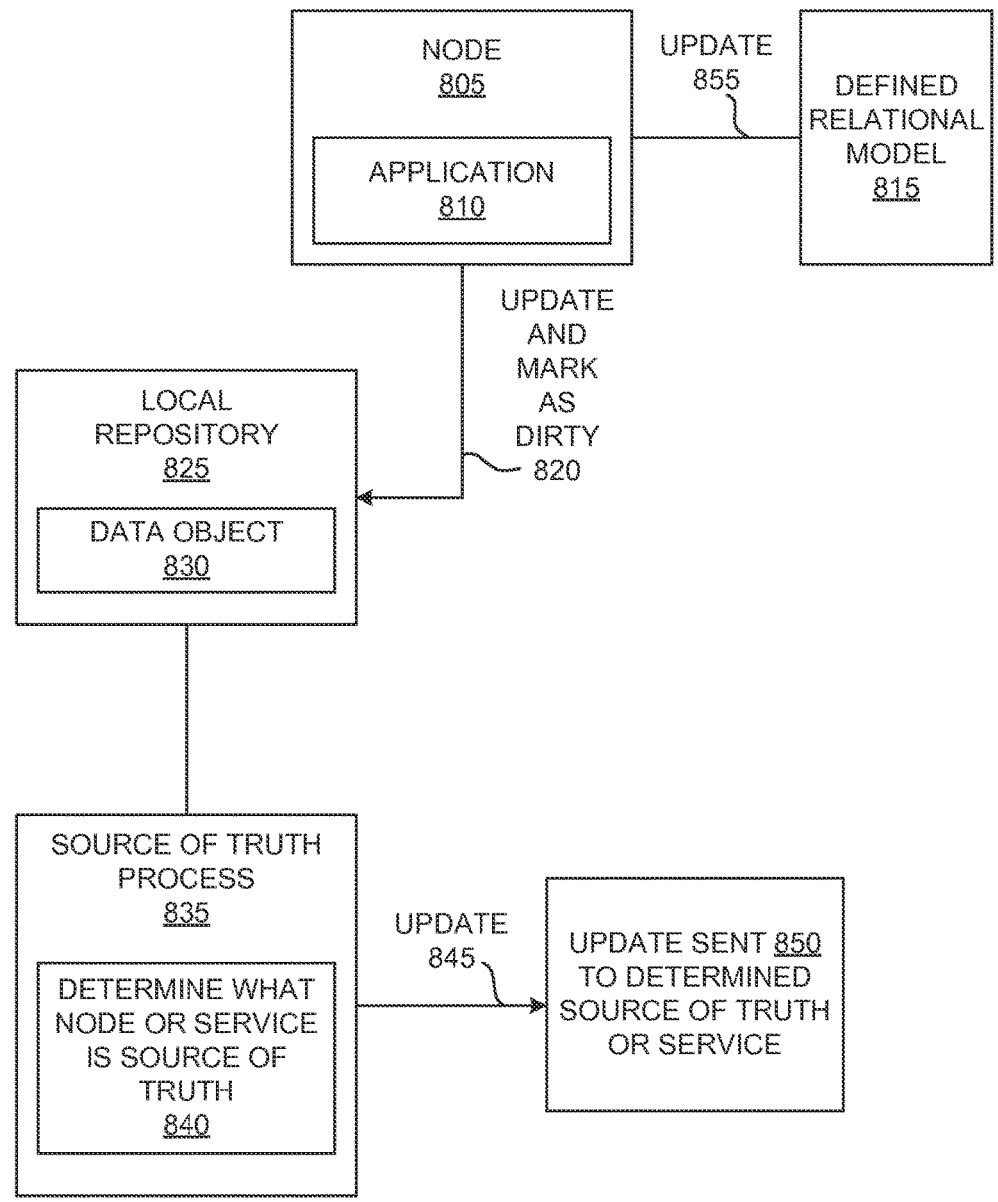
FIG. 8 shows a workflow for one or more embodiments of how an application on a node would update data, in accordance with an embodiment.

FIG. 8 shows a workflow for one or more embodiments of how an application 810 on a node 805 would update data. When an application 810 running on a node 805 acts to update 855 data in the defined relational model 815, it can update the local repository 825 and mark the data object 830 as dirty; in this way, there is an opening for any official source of truth to overwrite it once it sends data back to the node 805. Once this is done, the source of truth process 835 can determine 840 what node and service is the source of truth for this data object 830, and send the update 845 to that service 850. In other embodiments, the data object would be broadcast to the source of truth or service 850 that would then perform an update on the data object 830 in the defined relational model 815, and return the data object 830 either in response to a query or when otherwise appropriate.

Figure 9:
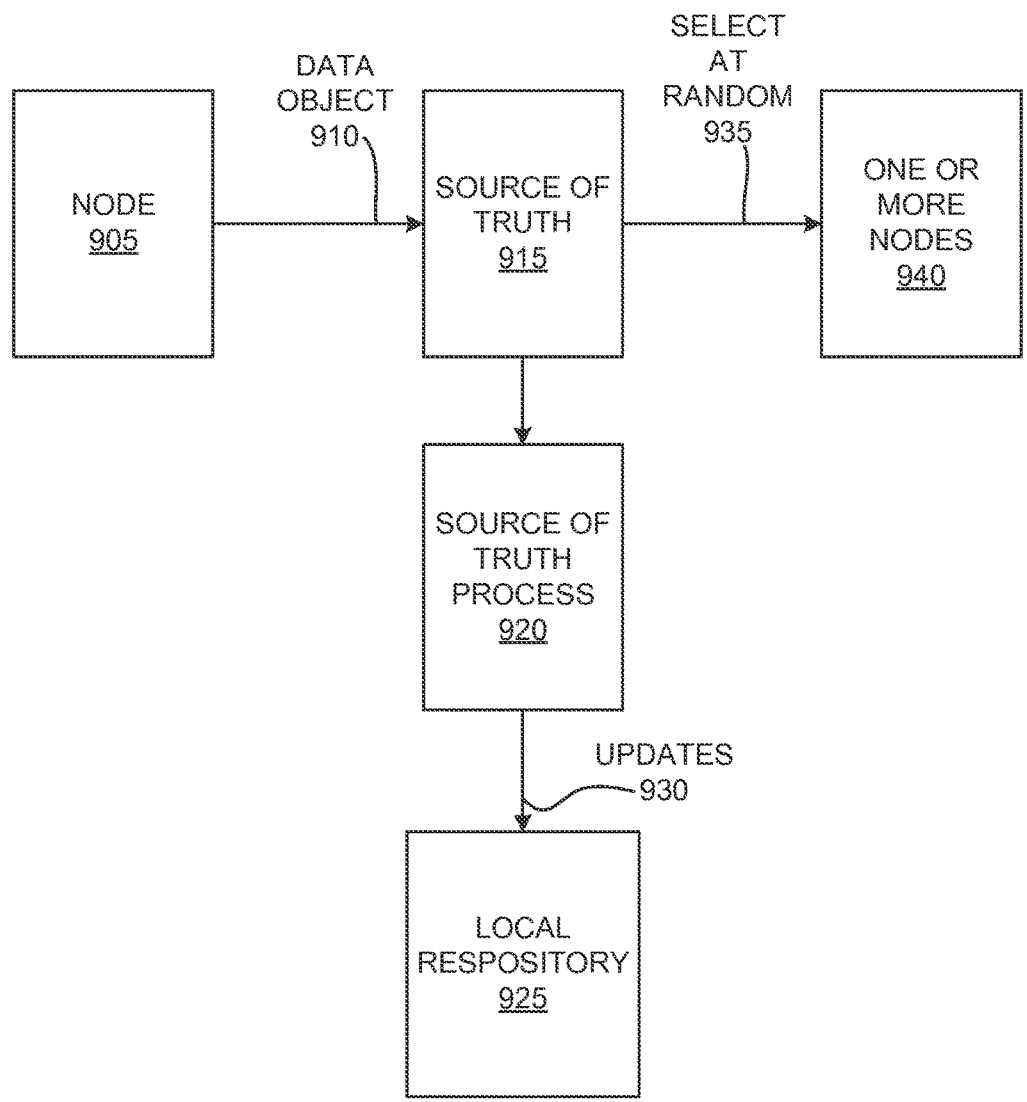
FIG. 9 shows a workflow for one or more embodiments of how an application on a node would process received data, in accordance with an embodiment.

FIG. 9 shows a workflow for one or more embodiments of how a source of truth 915 would process received data objects 910. When the source of truth 915 receives the data object 910 from a node 905, the source of truth process 920 updates 930 the local repository 925. If there is a data object from the same source with an earlier timestamp, that data object is replaced. In one or more embodiments, the source of truth 915 then participates in the protocol by selecting one or more nodes 940 at random to which to retransmit the data object 910, and sends the data object 910 on to the one or more nodes 940.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

In one or more embodiments, programming instructions for executing above described methods and systems are provided. The programming instructions are stored in a computer readable media.

With the above embodiments in mind, it should be understood that one or more embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one or more embodiments of the invention are useful machine operations. One or more embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One or more embodiments of the invention may be practiced with other computer system configurations including hand-held devices, microprocessor systems, microprocessor-based or programmable consumer electronics, mini-computers, mainframe computers and the like. The invention may also be practiced in distributing computing environments where tasks are performed by remote processing devices that are linked through a network.

One or more embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Example Virtual Infrastructure Manager

Figure 10:
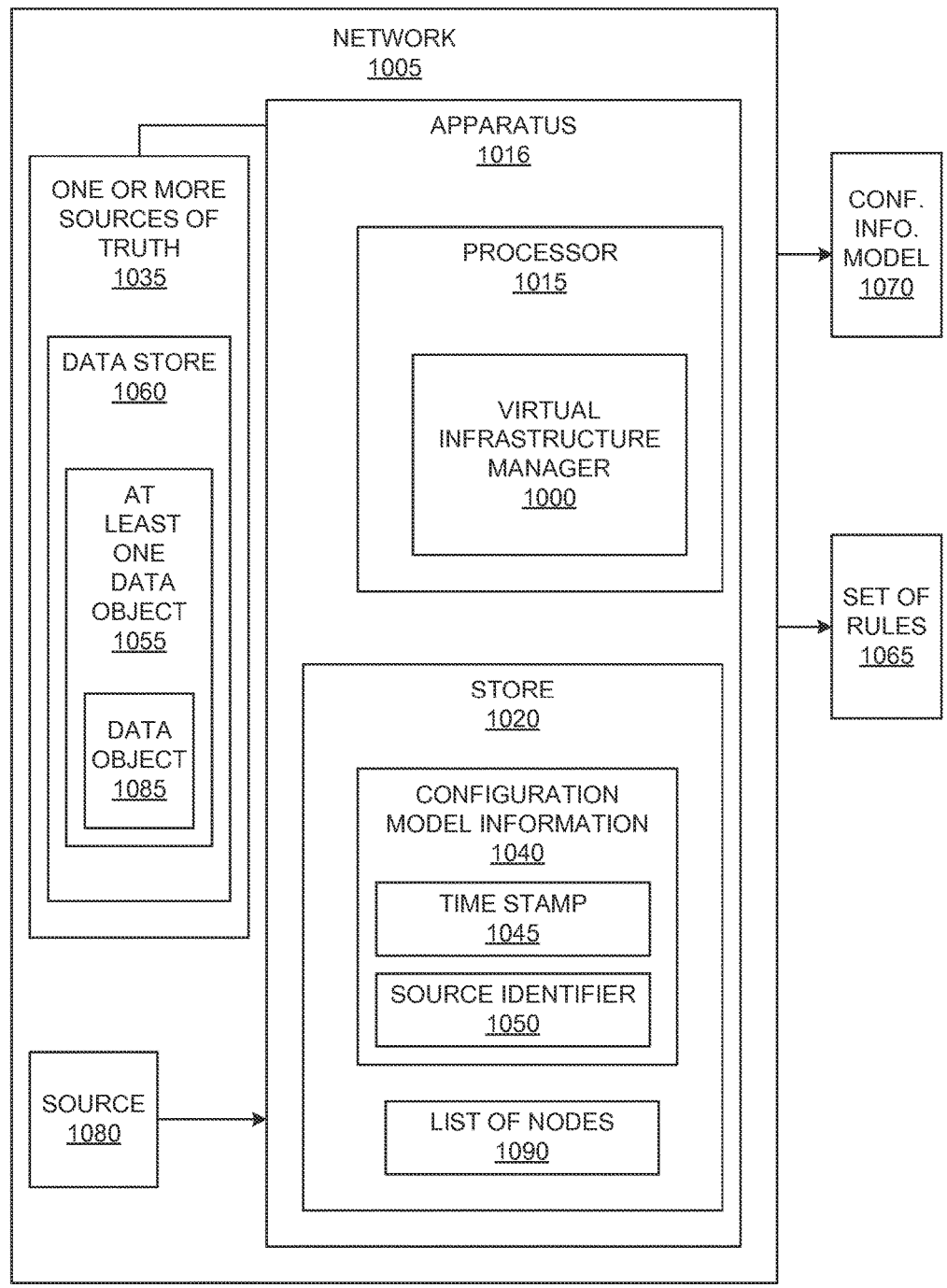
FIG. 10 is a block diagram that illustrates an apparatus for managing a virtual infrastructure, in accordance with an embodiment.
Figure 11:
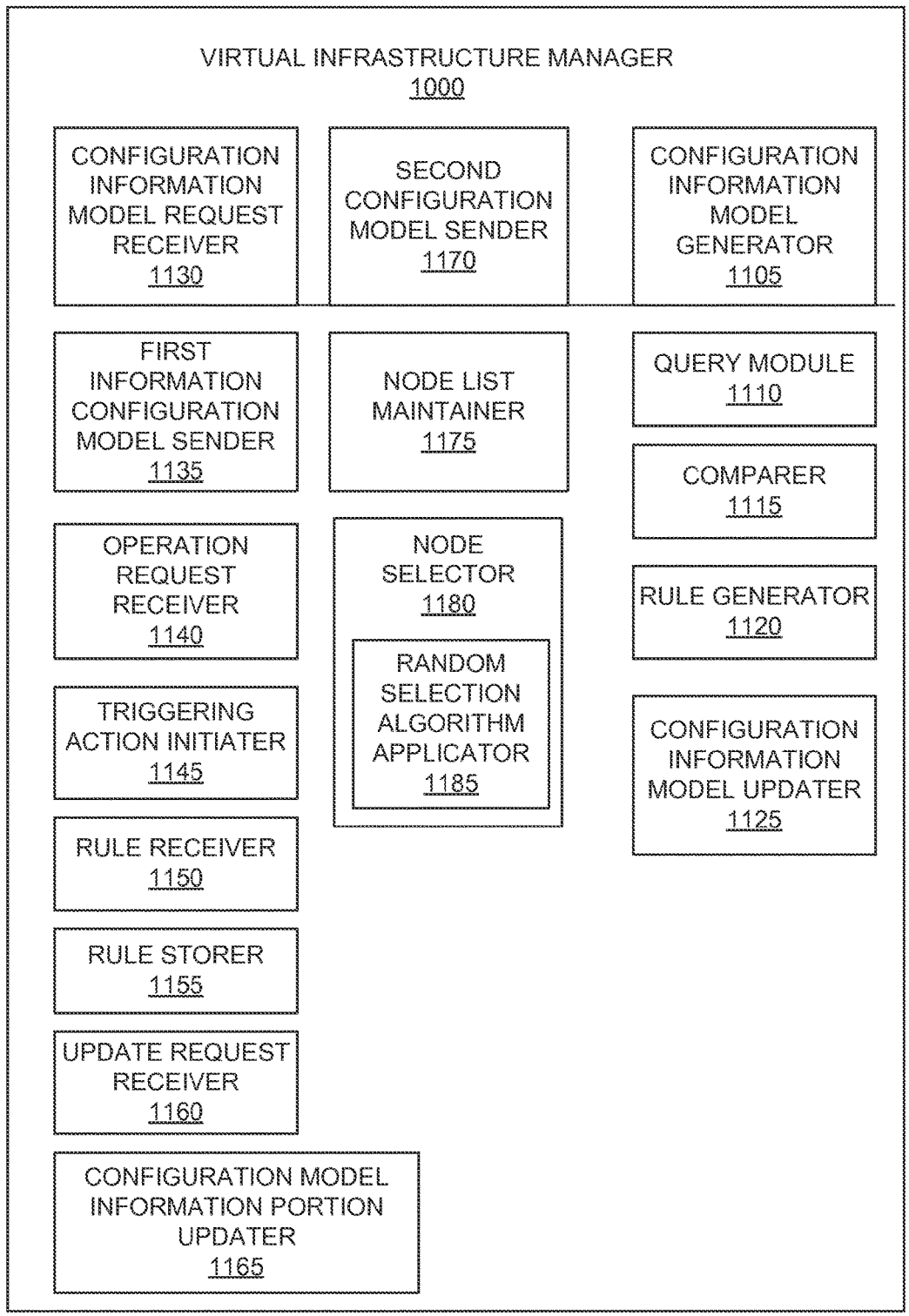
FIG. 11 is a block diagram of an embodiment of a virtual infrastructure manager, in accordance with an embodiment.

FIGS. 10 and 11 depict block diagrams that illustrate an apparatus 1010, residing on a network 1005, in accordance with an embodiment. The apparatus 1010 includes, in one embodiment: a processor 1015; and a store 1020. In one embodiment, the store 1020 resides at the processor 1015, while in another embodiment, the store 1020 is communicatively coupled with the processor 1015, residing at the apparatus 1010. The apparatus 1010, in one embodiment, is communicatively coupled with one or more sources of truth (herein after, "source of truth 1035" unless specified otherwise), wherein the source of truth 1035 of the one or more sources of truth includes at least one data object 1055, the significance of which will be explained below. The processor 1015 includes the virtual infrastructure manager 1000, in one embodiment. The virtual infrastructure manager 1000 includes the following modules coupled with a computer, such as computer 1300 of FIG. 13: a configuration information model generator 1105; a query module 1110; a comparer 1115; a rule generator 1120; and a configuration information model updater 1125. In some embodiments, the virtual infrastructure manager 1000 optionally includes any of the following: a configuration information model request receiver 1130; a first configuration information model sender 1135; an operation request receiver 1140; a triggering action initiater 1145; a rule receiver 1150; a rule storer 1155; an update request receiver 1160; a configuration model information portion updater 1165; a second configuration information model sender 1170; a node list maintainer 1175; and a node list selector 1180. In various embodiments, the processor 1015 includes and/or is communicatively coupled with the store 1020. The store 1020 includes configuration model information 1040. The configuration model information 1040, in one embodiment, at least includes a time stamp 1045 and a source identifier 1050, as will be described below.

The virtual infrastructure manager 1000 will now be discussed, with reference to FIGS. 10 and 11. As noted, in one embodiment, the virtual infrastructure manager 1000 includes the following components, all communicatively coupled with a processor: the configuration information model generator 1105; the query module 1110; the comparer 1115; the rule generator 1120; and the configuration information model updater 1125.

The configuration information model generator 1105 generates a configuration information model that represents a virtual infrastructure within the network 1005, based on the known virtual machines within the network 1105 and the network settings associated with each of the virtual machines.

The query module 1110 queries the source of truth 1035 (one or more sources of truth), other than the already known virtual machines that reside in the network 1005. The source of truth 1035 includes a data storage 1060 that stores at least one data object 1055. The at least one data object 1055 serves to answer a particular question, the answer of which is desired by the query module 1110.

The comparer 1115 compares the at least one data object 1055 with a store 1020 of configuration model information 1040, wherein the configuration model information 1040 includes a time stamp 1045 and a source identifier 1050.

The rule generator 1120, based on the comparing performed by the comparer 1115, generates a set of rules 1065 (the set of rules being already described herein).

The configuration information model updater 1125, based on the set of rules 1065 that were generated, updates the configuration information model 1070.

In one embodiment, the virtual infrastructure manager 1000 further includes: the configuration information model request receiver 1130; and a first configuration information model sender 1135. The configuration information model request receiver 1130 receives a request 1075 for configuration model information 1040. This request 1075 may be received from another processor that is communicatively coupled with the processor 1015, another module residing at the apparatus 1010 and communicatively coupled with the processor 1015. The first configuration information model sender 1135 sends to the source 1080 of the request 1075 (the source that requested the configuration model information 1040) the latest configuration model information associated with the source of truth 1035.

In one embodiment, the source of truth 1035, other than the known virtual machines, includes unconfigured computer services. In another embodiment, the source of truth 1035, other than the known virtual machines, includes out-of-network services.

In one embodiment, the virtual infrastructure manager 1000 further includes: an operation request receiver 1140; and a triggering action initiator 1145. The operation request receiver 1140 receives a request to perform an operation on a data object 1085 of the at least one data object 1055, wherein the data object 1085 is associated with the configuration model information 1040. The triggering action initiator 1145 initiates at least one triggering action. The at least one triggering action includes the following actions: monitoring a state of the data object 1085; and updating the configuration model information 1040 if the state of the data object 1085 changes.

In one embodiment, the virtual infrastructure manager 1000 further includes: a rule receiver 1150; and a rule storer 1155. The rule receiver 1150 receives the set of rules 1065. The rule storer 1155 stores the set of rules 1065, wherein the set of rules 1065 associates the configuration model information 1040 with the source of truth 1035.

In another embodiment, the virtual infrastructure manager 1000 further includes: an update request receiver 1160; and a configuration model information portion updater 1165. The update request receiver 1160 receives a request to update a portion of the configuration model information 1040. The configuration model information portion updater 1165 updates the portion of the configuration model information 1040.

In yet another embodiment, the virtual infrastructure manager 1000 further includes a second configuration information model sender 1170 which sends configuration model information updates to nodes. The nodes are described above.

In one embodiment, the virtual infrastructure manager 1000 further includes: a node list maintainer 1175; and a node selector 1180. The node list maintainer 1175 maintains a list of nodes 1090. The node selector 1180 selects nodes from the list of nodes 1090 to which to send the configuration model information updates. The list of nodes 1090 resides at a storage unit either coupled with the processor 1015 or stored at the processor 1015. In one embodiment, the list of nodes 1090 is stored at the store 1020.

In one embodiment, the apparatus 1010 includes a transmitter 1030; a receiver 1025; the store 1020; and the processor 1015. The transmitter 1030 queries a source of truth 1035, other than the known virtual machines. The source of truth 1035 includes a data storage that stores the at least one data object 1055 that answers a particular question.

The receiver 1025 receives the at least one data object 1055 from the source of truth 1035.

The store 1020 stores the configuration model information 1040.

The processor 1015 generates the configuration information model 1070 that represents a virtual infrastructure based on known virtual machines and network settings thereon. The processor 1015 also compares the data from the sources of truth with the store 1020 of configuration model information 1040, wherein the configuration model information 1040 includes a time stamp and a source identifier. The processor 1015 further generates the set of rules 1065, based on the comparing. Then, the processor 1015 updates the configuration information model 1070, based on the set of rules 1065.

Example Methods of Operation

The following discussion sets forth in detail some example methods of operation of embodiments. With reference to FIGS. 1-12B, a flow diagram of method 1200 for managing a virtual infrastructure is shown, in accordance with an embodiment. Method 1200 includes some procedures that, in various embodiments, are carried out by a processor, such as processor 1300 of FIG. 13, under the control of computer-readable and computer-executable instructions. In various embodiments, these computer-readable and computer-executable instructions are described as "code segments", and presented separately (e.g., first codes segment, second code segment, etc.) to describe such instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware).

The following discussion of method 1200 references FIGS. 1-12B unless specifically noted otherwise.

At step 1205 of method 1200, in one embodiment and as described herein, a configuration information model, such as configuration information model 1070, is generated, that represents a virtual infrastructure based on known virtual machines and network settings thereon.

At step 1210 of method 1200, in one embodiment and as described herein, one or more sources of truth, other than the known virtual machines, are queried. The one or more sources of truth include a data storage that stores at least one data object that answers a particular question. For example, the source of truth 1035, other than the known virtual machines, is queried. The source of truth 1035 includes a data storage 1060 that stores at least one data object 1055 that answers a particular question.

At step 1215 of method 1200, in one embodiment and as described herein, the data from the one or more sources of truth is compared with a store of configuration model information, wherein the configuration model information includes a time stamp and a source identifier. For example, the data from the source of truth 1035 is compared with the store 1020 of configuration model information 1040, wherein the configuration model information 1040 includes a time stamp and a source identifier.

At step 1220 of method 1200, in one embodiment and as described herein, based on the comparing at step 1215, a set of rules is generated. For example, based on the comparing performed at the step 1215, the set of rules 1065 is generated.

At step 1225, in one embodiment and as described herein, the method 1200 further includes: updating the configuration information model 1070, based on the set of rules 1065 that were generated at step 1220.

At step 1230, in one embodiment and as described herein, the method 1200 further includes: receiving a request for the configuration model information; and sending the latest configuration model information associated with a source of truth of the one or more sources of truth to a source of the request. For example, a request 1075 for the configuration model information model 1040 is received, and the latest configuration model information 1040 associated with the source of truth 1035 is sent to the source 1080 of the request 1075.

At step 1235, in one embodiment and as described herein, the method 1200 further includes: receiving a request to perform an operation on a data object of said at least one data object, wherein said data object is associated with said configuration model information; and initiating at least one triggering action, wherein a triggering action of the at least one triggering action includes: monitoring a state of the data object; and updating the configuration model information if the state of the data object changes. For example, the request to perform an operation on a data object 1085 of the at least one data object 1055 is received, wherein the data object 1080 is associated with the configuration model information 1040. The at least one triggering action is initiated, wherein a triggering action of the at least one triggering action includes: monitoring a state of the data object 1085; and updating the configuration model information 1040 if the state of the data object 1085 changes.

At step 1240, in one embodiment, the method 1200 further includes receiving and storing a set of rules, wherein the set of rules associates configuration model information with a source of truth. For example, the set of rules 1065 is received and stored. The set of rules 1065 associated configuration model information 1040 with a source of truth of the one or more sources of truth 1035.

At step 1245, in one embodiment, the method 1200 further includes: receiving a request to update a portion of the configuration model information; and updating the portion of the configuration model information. For example, a request to update a portion of the configuration model information 1040 is received and the portion of the configuration model information 1040 is updated.

At step 1250, in one embodiment, the method 1200 further includes: sending configuration model information updates to nodes.

At step 1255, in one embodiment, the method 1200 further includes: maintaining a list of nodes and selecting at least one node from the list of nodes to which to send the configuration model information updates. For example, the list of nodes 1090 is maintained and at least one node from the list of nodes 1090 to which to send the configuration model information updates is selected.

At step 1260, in one embodiment, the method 1200 further includes: selecting at least one node from the list of nodes 1090 using a random selection algorithm.

Example Computer System

With reference now to FIG. 13, all or portions of some embodiments described herein are composed of computer-readable and computer-executable instructions that reside, for example, in computer-usable/computer-readable storage media of a computer system. That is, FIG. 13 illustrates one example of a type of computer (computer system 1300) that can be used in accordance with or to implement various embodiments which are discussed herein. It is appreciated that computer system 1300 of FIG. 13 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 1300 of FIG. 13 is well adapted to having peripheral non-transitory computer-readable storage media 1302 such as, for example, a floppy disk, a compact disc, digital versatile disc, other disc based storage, universal serial bus "thumb" drive, removable memory card, and the like coupled thereto.

System 1300 of FIG. 13 includes an address/data bus 1304 for communicating information, and a processor 1306A coupled with bus 1304 for processing information and instructions. As depicted in FIG. 13, system 1300 is also well suited to a multi-processor environment in which a plurality of processors 1306A, 1306B, and 1306C are present. Conversely, system 1300 is also well suited to having a single processor such as, for example, processor 1306A. Processors 1306A, 1306B, and 1306C may be any of various types of microprocessors. System 1300 also includes data storage features such as a computer usable volatile memory 1308, e.g., random access memory (RAM), coupled with bus 1304 for storing information and instructions for processors1306A, 1306B, and 1306C.

System 1300 also includes computer usable non-volatile memory 1310, e.g., read only memory (ROM), coupled with bus 1304 for storing static information and instructions for processors 1306A, 1306B, and 1306C. Also present in system 1300 is a data storage unit 1312 (e.g., a magnetic or optical disk and disk drive) coupled with bus 1304 for storing information and instructions. System 1300 also includes an optional alphanumeric input device 1314 including alphanumeric and function keys coupled with bus 1004 for communicating information and command selections to processor 1306A or processors 1306A, 1306B, and 1306C. System 1300 also includes an optional cursor control device 1316 coupled with bus 1304 for communicating user input information and command selections to processor 1306A or processors 1306A, 1306B, and 1306C. In one embodiment, system 1300 also includes an optional display device 1318 coupled with bus 1304 for displaying information.

Referring still to FIG. 13, optional display device 1318 of FIG. 13 may be a liquid crystal device, cathode ray tube, plasma display device or other display device suitable for creating graphic images and alphanumeric characters recognizable to a user. Optional cursor control device 1316 allows the computer user to dynamically signal the movement of a visible symbol (cursor) on a display screen of display device 1018 and indicate user selections of selectable items displayed on display device 1318. Many implementations of cursor control device 1316 are known in the art including a trackball, mouse, touch pad, joystick or special keys on alphanumeric input device 1314 capable of signaling movement of a given direction or manner of displacement. Alternatively, it will be appreciated that a cursor can be directed and/or activated via input from alphanumeric input device 1314 using special keys and key sequence commands. System 1300 is also well suited to having a cursor directed by other means such as, for example, voice commands. System 1300 also includes an I/O device 1320 for coupling system 1300 with external entities. For example, in one embodiment, I/O device 1320 is a modem for enabling wired or wireless communications between system 1300 and an external network such as, but not limited to, the Internet.

Referring still to FIG. 13, various other components are depicted for system 1300. Specifically, when present, an operating system 1322, applications 1324, modules 1326, and data 1328 are shown as typically residing in one or some combination of computer usable volatile memory 1308 (e.g., RAM), computer usable non-volatile memory 1310 (e.g., ROM), and data storage unit 1312. In some embodiments, all or portions of various embodiments described herein are stored, for example, as an application 1324 and/or module 1326 in memory locations within RAM 808, computer-readable storage media within data storage unit 1312, peripheral computer-readable storage media 1302, and/or other tangible computer-readable storage media.

What we claim is:

1. A non-transitory, computer-readable medium comprising instructions that, when executed by a processor of a computing device, cause the computing device to:
    generate a configuration information model representing a virtual infrastructure based on known virtual machines and network settings thereon;
    retrieve a data object stored in a data storage, the data object associated with an unconfigured computer service that is not represented by the configuration information model;
    compare the data object to the configuration information model, wherein said configuration information model comprises a time stamp and a source identifier;
    determine, based on the comparison, that the configuration information model does not include the unconfigured computer service; and
    based on the determination, update the configuration information model to include the unconfigured computer service.

2. The non-transitory, computer-readable medium of claim 1, the instructions further causing the computing device to receive a request for said configuration information model and sends an updated configuration information model.

3. The non-transitory, computer-readable medium of claim 1, the instructions further causing the computing device to retrieve a data object associated with an out-of-network service that is not represented by the configuration information model, and further updating the configuration information model to include the out-of-network service.

4. The non-transitory, computer-readable medium of claim 1, the instructions further causing the computing device to:
initiate at least one triggering action, wherein a triggering action of said at least one triggering action comprises:
monitoring a state of said data object; and
updating said configuration information model if said state of said data object changes.

5. The non-transitory, computer-readable medium article of manufacture of claim 1, the instructions further causing the computing device to receive a set of rules, wherein said set of rules associates an update to the configuration information model with the data object.

6. The non-transitory, computer-readable medium of claim 1, the instructions further causing the computing device to update a portion of the configuration information model based on receiving a request to update the portion of the configuration information model.

7. The non-transitory, computer-readable medium of claim 1, the instructions further causing the computing device to send the updated configuration information model to one or more nodes.

8. The non-transitory, computer-readable medium of claim 7, the instructions further causing the computing device to maintain a list of nodes and select at least one node from said list of nodes to which to send the updated configuration information model.

9. The non-transitory, computer-readable medium of claim 8, the instructions further causing the computing device to select at least one node from said list of nodes using a random selection algorithm.

10. A method for managing a virtual infrastructure, the method comprising:
generating a configuration information model representing a virtual infrastructure based on known virtual machines and network settings thereon;
retrieving a data object stored in a data storage, the data object associated with an unconfigured computer service that is not represented by the configuration information model;
comparing the data object to the configuration information model, wherein said configuration information model comprises a time stamp and a source identifier;
determine, based on the comparison, that the configuration information model does not include the unconfigured computer service; and
based on the determination, update the configuration information model to include the unconfigured computer service.

11. The method of claim 10, further comprising:
receiving a request for said configuration information model; and
sending the updated configuration information model.

12. The method of claim 10, further comprising retrieving a data object associated with an out-of-network service that is not represented by the configuration information model, and further updating the configuration information model to include the out-of-network service.

13. The method of claim 10, further comprising:
initiating at least one triggering action, wherein said at least one triggering action comprises:
monitoring a state of said data object; and
updating said configuration information model if said state of said data object changes.

14. The method of claim 10, further comprising:
receiving a set of rules that associates an update to the configuration information model with the data object.

15. The method of claim 10, further comprising updating a portion of the configuration information model based on receiving a request to update the portion of the configuration information model.

16. The method of claim 10, further comprising causing the computing device to send the updated configuration information model to one or more nodes.

17. The method of claim 16, further comprising:
maintaining a list of nodes; and
selecting at least one node from said list of nodes to which to send the updated configuration information model.

18. An apparatus for managing a virtual infrastructure, said apparatus comprising:
a memory store; and
a hardware processor configured to execute a non-transitory, computer-readable medium comprising instructions that cause the processor to:
generating a configuration information model representing a virtual infrastructure based on known virtual machines and network settings thereon;
retrieve a data object stored in a data storage, the data object associated with an unconfigured computer service that is not represented by the configuration information model;
comparing the data object to the configuration information model, wherein said configuration information model comprises a time stamp and a source identifier;
determining, based on the comparison, that the configuration information model does not include the unconfigured computer service; and
based on the determination, updating the configuration information model to include the unconfigured computer service.

* * * * *